June 2, 1931.    F. T. FARMER    1,808,646
LAWN MOWER
Original Filed May 5, 1925    2 Sheets-Sheet 1
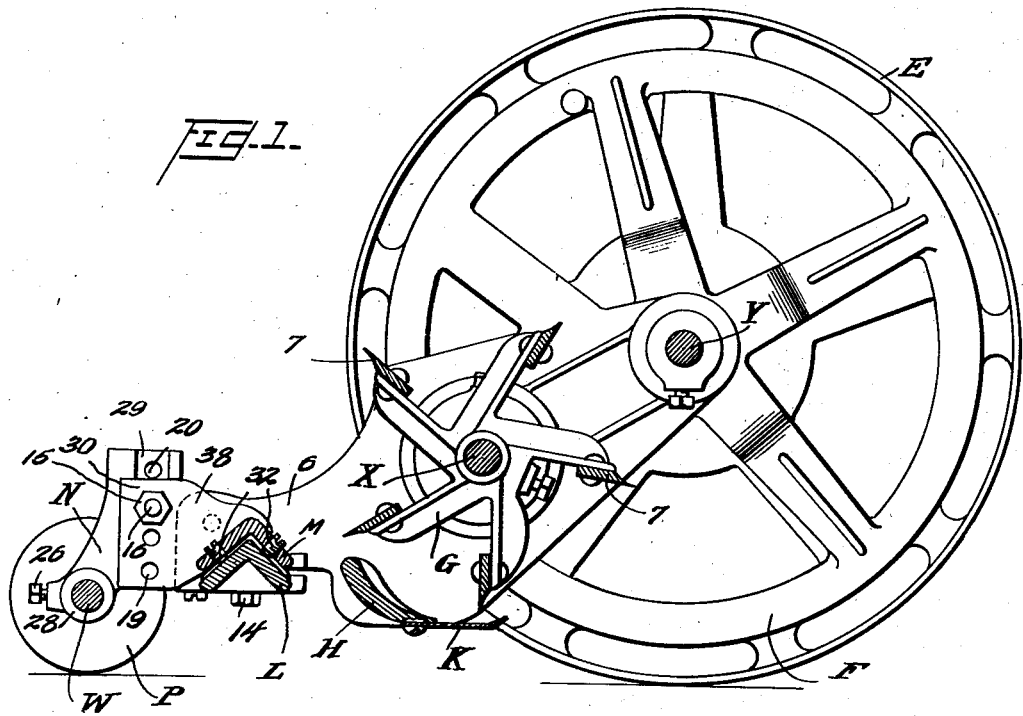
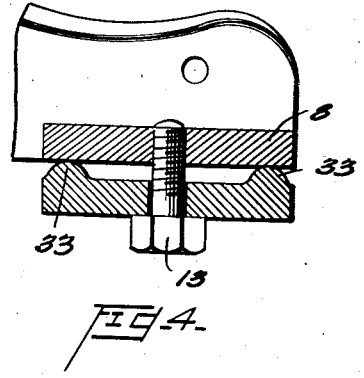
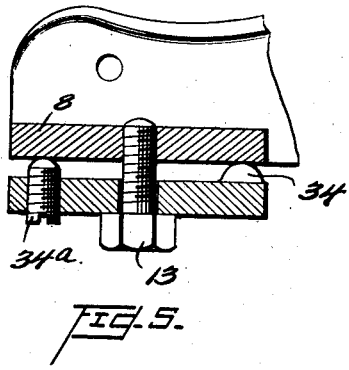
Frank T. Farmer
INVENTOR.
BY John Boyle
ATTORNEY.

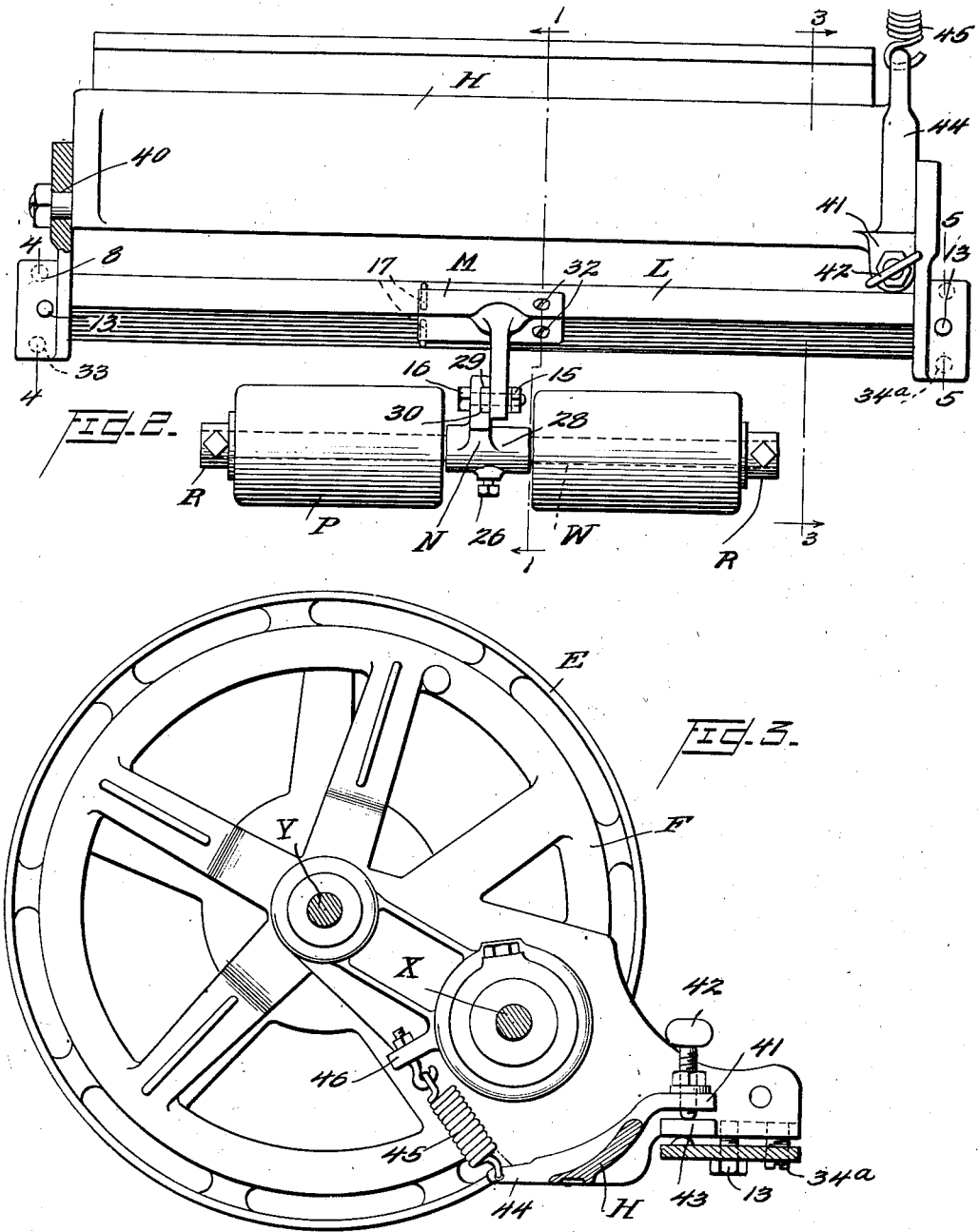

Patented June 2, 1931

1,808,646

UNITED STATES PATENT OFFICE

FRANK T. FARMER, OF DETROIT, MICHIGAN, ASSIGNOR OF ONE-HALF TO ROBERT E. FARMER, OF NEW YORK, N. Y.

LAWN MOWER

Continuation of application Serial No. 28,143, filed May 5, 1925. This application filed March 21, 1928. Serial No. 263,256.

This application is a continuation of my application filed May 5, 1925, Serial No. 28,143.

My invention relates to lawn mowers and among the objects of the invention are:

1. To provide means for supporting the ends of the two end frames of the mower substantially equal at all times, no matter how uneven the ground is, over which the mower is run, thereby preventing the twisting strain that is applied to the cross rod of the mower, with the resultant tendency to loosen the set screws that hold the end frames to the cross rod, thus destroying the cutting adjustment of the reel to the cutter bar. The sagging of one end frame of a lawn mower due to its own weight, no matter how slight, is augmented when the tie rod set screw works loose, the result of which is to destroy the cutting adjustment of the knives. This is explained by the fact that when the end frame sags, it revolves on the center or tie rod as an axis. The radius of the circle described by the center of the reel is shorter than the radius of the circle described by the cutting edge of the stationary knife; consequently, when one end frame of the mower is pushed down from the roller end the two cutting edges are separated, thus destroying the cutting properties.

The twisting strain referred to occurs every time the mower is pushed over uneven ground, when the end of the end frames is supported independently by a wooden roller. The twisting strain is constant on the mowers as now built if the roller is attached with one end closer to the ground than the other.

2. To provide a simple and easy method of attaching the roller that supports the end of a lawn mower.

3. To provide a convenient and simple way of adjusting the roller up or down to govern the length that the grass is to be cut.

4. To provide means for bringing the tread of said roller into the same horizontal plane as that of the tread of the drive wheels and when the alignment is attained, to permanently secure it thus.

5. To provide means whereby the mower frame has a three-point support, which eliminates substantially all sagging of the end frames and permanently maintains the adjusted alignment of the cutter bar and reel, thus making practical the use of a pivoted freely floating cutter bar. The cutting tension of the cutter bar is controlled by a tension spring, which permits the cutter bar blade to freely coact with each individual reel blade and only one adjusting screw is necessary to control the contact of the cutter bar blade against the reel blades.

More specifically, the device consists of a bar extending from the end of one end frame of a lawn mower to the end of the other frame, the ends of the bar being secured to the frames as hereinafter described. I shall refer to this bar as the "aligning bar", since it carries the supporting bracket for the roller which supports the rear end of the mower. In the center of the aligning bar, midway between the end frames of the mower is secured a bracket, said bracket being provided with means to adjust one end relative to the bar, as hereinafter described, and also being provided with a lug projecting rearwardly from the aligning bar, said lug being used to attach the roller hanger to. The above mentioned bracket I shall call the "roller hanger bracket."

Attached to the roller hanger bracket is a roller hanger. Said hanger is provided with a hub, in which a shaft is mounted. The shaft projects each way from the roller hanger hub and is parallel with the carrying bar. Each end of the shaft forms a spindle upon which the rollers are mounted and revolve. The shaft being supported in the center only, when two rollers are used, one is on each side of the center support of the shaft. The rollers are held on the shaft by means of collars, one at each end of the roller shaft, and are secured to the shaft by means of set screws.

A practical embodiment of my invention is illustrated in the accompanying drawings, wherein letters are used to designate the individual parts, the same letter being used for the same part in the several figures, while numerals are used to designate the various features of the parts, the same numeral being used for the same features of the several figures.

I am aware that my invention may be embodied in other specific forms without departing from the spirit or essential attributes thereof, and I therefore desire the present embodiment to be considered in all respects as illustrative and not restrictive, reference being had to the appended claims rather than to the foregoing description to indicate the scope of the invention.

Fig. 1 is a vertical transverse section through the lawn mower and roller hanger;

Fig. 2 is a plan view of the roller hanger and cutter bar, with a detail in section;

Fig. 3 is a vertical transverse section through the lawn mower corresponding to the line 3—3 of Fig. 2;

Fig. 4 is a transverse section on the line 4—4 of Fig. 2; and

Fig. 5 is a transverse section on the line 5—5 of Fig. 2.

In the drawings, E are the drive wheels, F the end frames and Y the shaft to which the end framees are secured by a set screw and upon which shaft the wheels E are revolubly mounted. G represents the spider upon which the revolving knives 7 are mounted and X is the reel shaft, revolubly mounted in the end frames F to which the spider G is secured by a set screw. H is the adjustable cutter bar pivotally mounted in the end frames F to which is fastened the knife K.

Back of the cutter bar H on each tail piece of the end frame F is a lug 8, which extends out at a right angle to the tail piece 6 and is a part of the said tail piece. To the lugs 8 are bolted the ends of the aligning bar L by means of the bolts 13.

To the aligning bar L is bolted the roller hanger bracket M by means of the bolt 14, and to the roller hanger bracket M is fastened the roller hanger N by means of the bolt 16 and the nut 15, the bolt 16 being passed through one of the holes 20 of the roller hanger and one of the holes 19 of the roller hanger bracket. The roller shaft W is secured in the hub 28 of the roller hanger N by means of a set screw. The rollers P are mounted on the roller shaft W and are held on the roller shaft by the collars R which are secured to the shaft by set screws.

At one end of the aligning bar L are two upwardly extending lugs 33 placed at opposite sides of the bar, the center of the lugs being in line with the center of the bolt hole in the end of the bar. On the opposite end of the aligning bar is a lug 34 and adjusting screw 34a in line with the center of the bolt hole in the end of the bar.

In practice, the mower is assembled and all adjustments made. The aligning bar is then bolted on, the lugs 33 taking a bearing on the lug 8 of the tail piece 6, thereby causing the bar L to align itself with the end frame to which it is bolted. The lug 34 and adjusting screw 34a at the opposite end of the carrying bar permit the drawing tight of that end of the bar, without causing a twisting strain on the aligning bar and a resultant springing of the end frames of the mower out of line. In other words, the aligning bar with lugs 33 and lug 34 and adjusting screw 34a arranged as shown in the drawing can be drawn tight to the end frames without springing the mower out of adjustment.

In my prior Patent No. 1,122,709, issued Dec. 29, 1914, I have disclosed an aligning bar connecting the end frames back of the cutter bar and its purpose is to align the frames so as to bring the reel and cutter bar into a perfect cutting adjustment and secure them thus. This aligning bar in conjunction with the tie rod in the mower was not sufficient to prevent sagging of one end of the mower frame when using a ground roller supported at each end. When the ground roller is attached to the center of the aligning bar, the mower cuts perfectly the entire length of the cutter bar under every condition.

Near the center of the aligning bar and opposite each other are lugs 17, which extend upwardly from the top of the bar. Upon these lugs 17 is placed the roller hanger bracket M, their purpose being to form the bearing for that end of the roller hanger bracket upon the aligning bar.

In the opposite end of the roller hanger bracket M are threaded screws 32, which form the bearing for that end of the hanger bracket M upon the aligning bar L. The screws 32 are adjusting screws and by them that end of the roller hanger bracket can be raised or lowered as the case may require to bring the rollers P in alignment or parallel with the base line of the drive wheels. When this alignment is effected, the roller hanger bracket is securely fastened to the aligning bar L by means of the bolt 14, a hole being provided for it in both aligning bar L and roller hanger bracket M.

The alignment of the rollers with the base line of the wheels thus becomes permanent and is not changed when the roller is adjusted up or down to cut different lengths of grass.

The roller hanger bracket M is provided with a lug 38 which extends rearwardly and beyond the carrying bar when the bracket is mounted on the bar. The lug 38 is provided with a rib or shoulder 30 which extends vertically the length of said lug.

The roller hanger N is bolted onto the lug 38 of the roller hanger bracket M through the medium of a groove or slot 29 running the entire length of the said roller hanger. This slot 29 of the roller hanger fits over the rib 30 of the roller hanger bracket and holds the roller hanger in a vertical position, thus requiring only one bolt 16 to clamp the roller hanger to the hanger bracket. The holes 20 of the roller hanger N and the holes 19 of the roller hanger bracket M provide a wide range of adjustment for the roller.

The roller hanger N is provided with a hub 28, bored to receive the roller shaft W, which extends through the hub, the ends of the said shaft being equally distant from the end frames of the mower, the said shaft being secured in this position by the set screw 26. On the roller shaft W are mounted two wooden rollers P, one on each side of the hub 28. The rollers P may be of the proportions shown or may extend the width of the mower.

The cutter bar H is pivotally mounted for adjustment, at each end 40 in the end frames. Extending rearwardly of the cutter bar is a lug 41 through which is threaded a thumb screw 42, which at its lower end engages a lug 43 carried by the end frame. At an end of the cutter bar is a forwardly projecting finger 44 to which is connected one end of the spring 45, the other end of the spring being adjustably connected to a lug 46 on the end frame. The coaction of the spring and adjusting screw serve to locate the cutter bar in the desired position.

It has heretofore been impossible, in lawn mowers of the old type, to use a pivoted freely floating cutter bar having a single screw adjustment, and maintain the adjusted alinement of the cutter bar and reel, for the reason that the frame would sag, take a permanent sagging set, and the cutter bar and reel would not coact so as to cut their entire length. By using my roller hanger, I find the frame will not sag, the adjusted alinement of the cutter bar and reel is permanently maintained and each reel blade will coact with the cutter bar its entire length.

From the foregoing description, it will be apparent that I provide a three-point support for the mower frame, one at one end of each of the end frames and the other intermediate and at the other end of the end frames. Such a three-point support will negotiate uneven ground with less tendency to distortion of the mower frame than in the old type of mowers which are of the four-point support type. When the ends of the frame of a lawn mower are supported upon the ends of a bar and this bar in turn supported in its center by a bracket and hanger carrying rollers that in turn rest upon the ground, no matter how uneven the ground is, the raising and lowering of the roller, whether the contact be all along both rollers, in the center, or at one end, both ends of the aligning bar are lifted equally and consequently both ends of the mower frame, and substantially all twisting strain is eliminated.

The cutting alinement of the cutter bar and reel are constantly maintained, thus permitting a single screw controlled, spring sustained, cutter bar to be practical.

Furthermore, my invention provides a simple method of adjusting the roller up or down to make the mower cut long or short, it being necessary only to loosen and change one bolt to effect this adjustment.

In addition, my invention provides the simplest possible form of cutter bar adjustment. The turning of one thumb screw adjusts the entire cutter bar to or from the reel at the will of the operator.

While I have particularly described my invention in connection with a rear cut mower, the invention is also applicable to a front cut mower, where the wheels are at the back end of the mower.

Having thus described my invention what I claim as new and useful and desire to secure by Letters Patent of the United States is:

1. In a lawn mower having end frames, an aligning bar connecting the end frames, means for supporting rollers, the said means being carried by the aligning bar intermediate its ends and means for bringing the tread of said roller into the same horizontal plane as that of the tread of the drive wheels.

2. In a lawn mower having end frames, an aligning bar connecting the end frames, means for supporting rollers, the said means being carried by the carrying bar intermediate its ends, means for vertically adjusting the rollers relative to the end frames and means for bringing the tread of said roller into the same horizontal plane as that of the tread of the drive wheels.

3. In a lawn mower having end frames, an aligning bar connecting the end frames, a bracket secured to the center of the aligning bar, a shaft supported by the said bracket, a roller mounted on the said shaft and means for vertically adjusting one end of the said bracket, bringing the tread of said roller into the same horizontal plane as that of the tread of the drive wheels.

4. In a lawn mower having end frames, a bar connecting the end frames, a bracket secured to said bar, a roller hanger secured to said bracket, a shaft mounted in the roller hanger, said shaft forming a bearing upon which supporting rollers rotate and means for bringing the tread of said roller into the same horizontal plane as that of the tread of the drive wheels.

5. In a lawn mower having end frames, an aligning bar connecting the end frames, a roller hanger bracket secured to the center of the aligning bar and provided with means to adjust one end vertically relative to the said bar, a roller hanger attached to the said bracket, means for vertically adjusting the roller hanger relative to the said bracket and rollers carried by the roller hanger.

6. A lawn mower provided with drive wheels, end frames supported by the drive wheels and a ground roller during the cutting operation, a rotary reel provided with knives and carried by the end frames and rotating on an axis intermediate the axis of the drive wheels and the ground roller, a bar connecting the end frames, a bracket secured to the center of said bar, a shaft supported by the said bracket, the ground roller being mounted on the said shaft.

7. A lawn mower provided with drive wheels, end frames supported by the drive wheels and a ground roller during the cutting operation, a rotary reel provided with knives and carried by the end frames and rotating on an axis intermediate the axis of the drive wheels and the ground roller, a bar connecting the end frames, a bracket secured to the center of said bar, a shaft supported by the said bracket, the ground roller being mounted on the said shaft, and means for vertically adjusting the ground roller relative to the end frames.

8. A lawn mower provided with drive wheels, end frames supported by the drive wheels and a ground roller during the cutting operation, a rotary reel provided with knives and carried by the end frames and rotating on an axis intermediate the axis of the drive wheels and the ground roller, a bar connecting the end frames, a bracket secured to the said bar, a roller hanger secured to said bracket, a shaft mounted in the roller hanger, said shaft forming a bearing upon which the ground roller rotates.

9. In a lawn mower of the type provided with drive wheels, end frames supported by the drive wheels and a ground roller during the cutting operation, a rotary reel provided with knives and carried by the end frames and rotating on an axis intermediate the axis of the drive wheels and the ground roller, the improvement consisting in providing a three point support for the mower frame.

10. In a lawn mower of the type provided with drive wheels, end frames supported by the drive wheels and a ground roller during the cutting operation, a rotary reel provided with knives and carried by the end frames and rotating on an axis intermediate the axis of the drive wheels and the ground roller, the improvement comprising a three point support for the mower frame and consisting of the pair of end frames supported at one end by the drive wheels and a single support for the other end of the mower frame.

11. In a lawn mower of the type provided with drive wheels, end frames supported by the drive wheels and a ground roller during the cutting operation, a rotary reel provided with knives and carried by the end frames and rotating on an axis intermediate the axis of the drive wheels and the ground roller, the improvement comprising a three point support for the mower frame, two of the points being at one side of the mower frame and the third point being at the opposite side.

12. In a lawn mower of the type provided with drive wheels, end frames supported by the drive wheels and a ground roller during the cutting operation, a rotary reel provided with knives and carried by the end frames and rotating on an axis intermediate the axis of the drive wheels and the ground roller, the improvement comprising a three point support for the mower frame and consisting of a pair of end frames supported at one side by the drive wheel and a single support for the other side of the mower frame by means of the ground roller.

13. In a lawn mower of the type provided with drive wheels, end frames supported by the drive wheels and a ground roller during the cutting operation, a rotary reel provided with knives and carried by the end frames and rotating on an axis intermediate the axis of the drive wheels and the ground roller, the improvement consisting in providing a three point support for the mower frame, and means for vertically adjusting the ground roller.

14. In a lawn mower of the type provided with drive wheels, end frames supported by the drive wheels and a ground roller during the cutting operation, a rotary reel provided with knives and carried by the end frames and rotating on an axis intermediate the axis of the drive wheels and the ground roller, the improvement comprising a three point support for the mower frame and consisting of a pair of end frames supported at one side by the drive wheels and a single support for the other side of the mower frame by means of the ground roller, and means for bringing the tread of said ground roller into the same horizontal plane as that of the tread of the drive wheels.

15. In a lawn mower of the type provided with drive wheels, end frames supported by the drive wheels and a ground roller during the cutting operation, a rotary reel provided with knives and carried by the end frames and rotating on an axis intermediate the axis of the drive wheels and the ground roller, the improvement consisting in providing a three point support for the mower frame and in combination therewith a floating cutter bar adjustably mounted in the end frames and means for varying and maintaining the cutting adjustment of the reel to the cutter bar.

16. In a lawn mower of the type provided with drive wheels, end frames supported by the drive wheels and a ground roller during the cutting operation, a rotary reel provided with knives and carried by the end frames and rotating on an axis intermediate the axis of the drive wheels and the ground roller, the improvement consisting in providing a three point support for the mower frame and in combination therewith a floating cutter bar pivotally mounted in the end frames and a screw threaded adjustment between the cutter bar and the end frame for adjusting the cutter bar relative to the reel.

In testimony whereof I affix my signature.

FRANK T. FARMER.